No. 834,487. PATENTED OCT. 30, 1906.
E. E. PETERSON.
WORKMAN'S TIME RECORDER.
APPLICATION FILED JAN. 31, 1905.
9 SHEETS—SHEET 1.
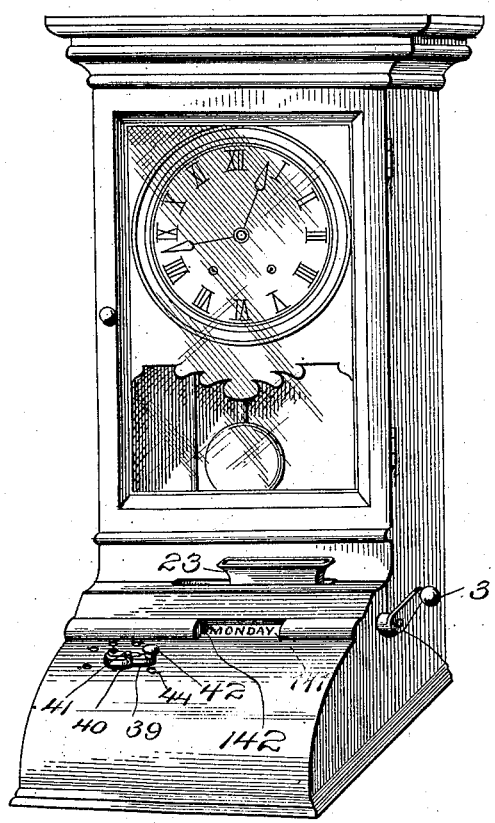
Witnesses
J. M. Fowler Jr
Edgar M. Kitchin
Inventor
Eric E. Peterson,
By Munn, Frances Lawrence
Attorneys

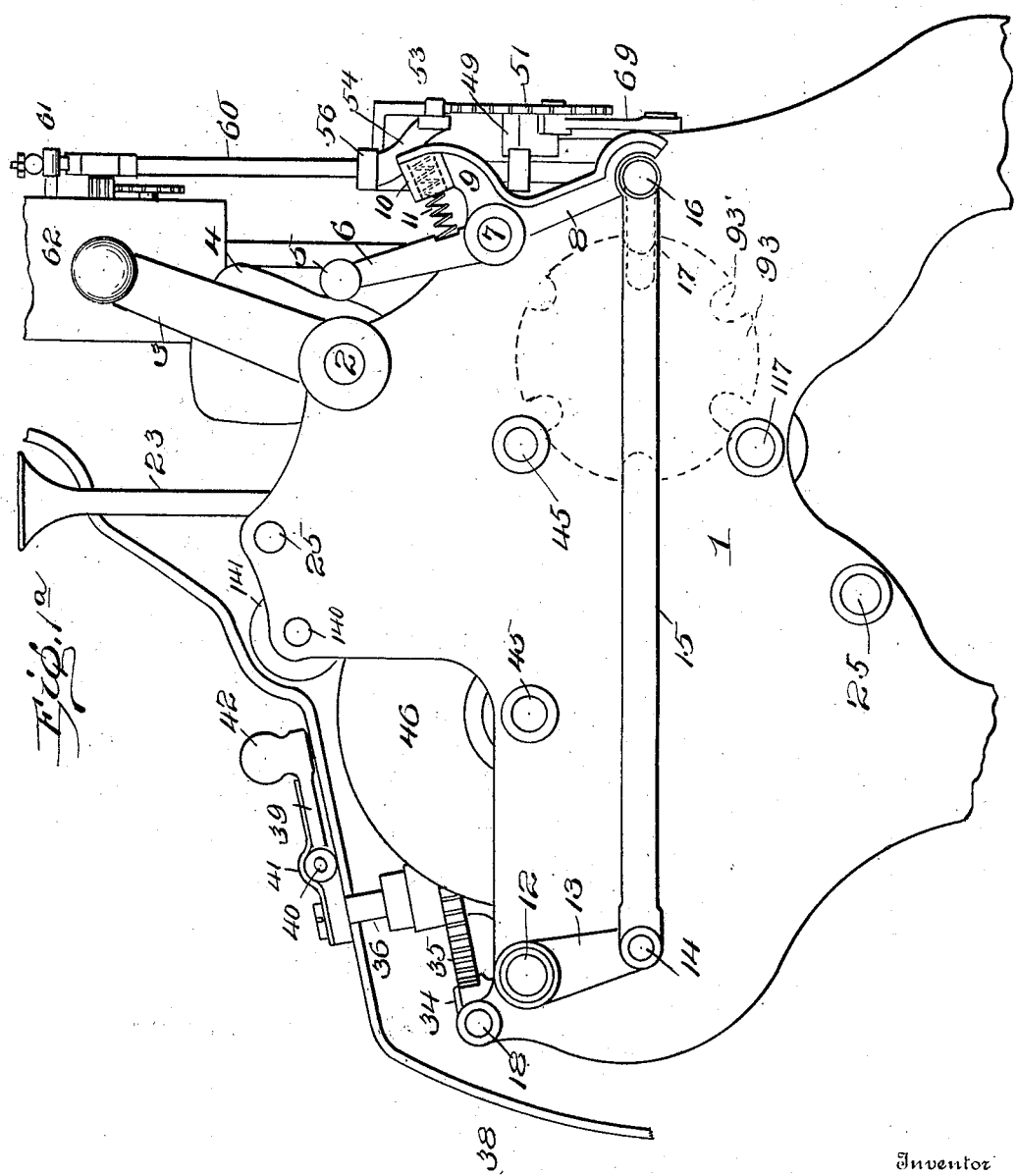

No. 834,487. PATENTED OCT. 30, 1906.
E. E. PETERSON.
WORKMAN'S TIME RECORDER.
APPLICATION FILED JAN. 31, 1905.
9 SHEETS—SHEET 3.
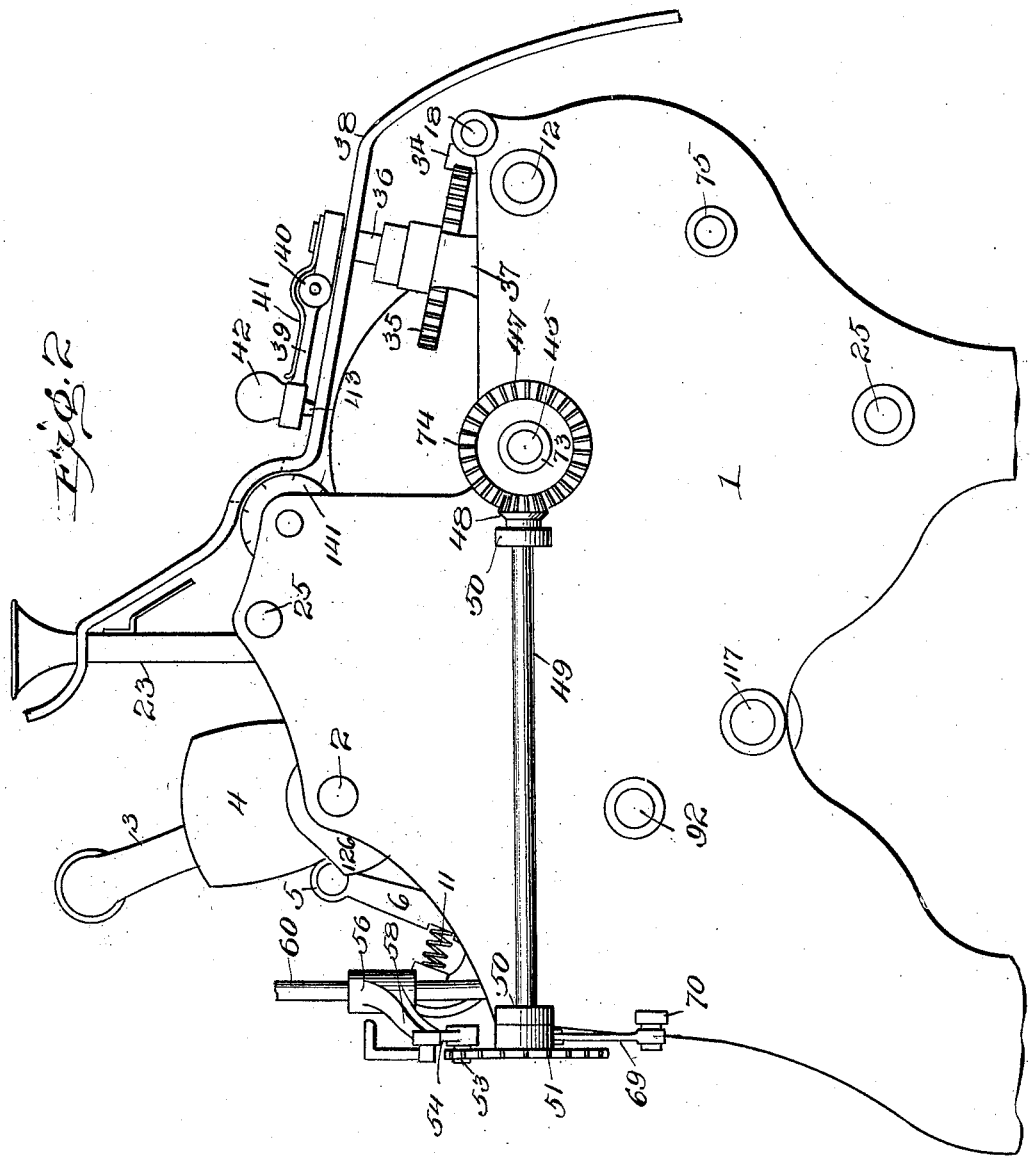
Witnesses
J. M. Fowler Jr.
Edgar M. Kitchin
Inventor
Eric E. Peterson,
By Mason, Fenwick & Lawrence
Attorneys No. 834,487. PATENTED OCT. 30, 1906.
E. E. PETERSON.
WORKMAN'S TIME RECORDER.
APPLICATION FILED JAN. 31, 1905.
9 SHEETS—SHEET 4.
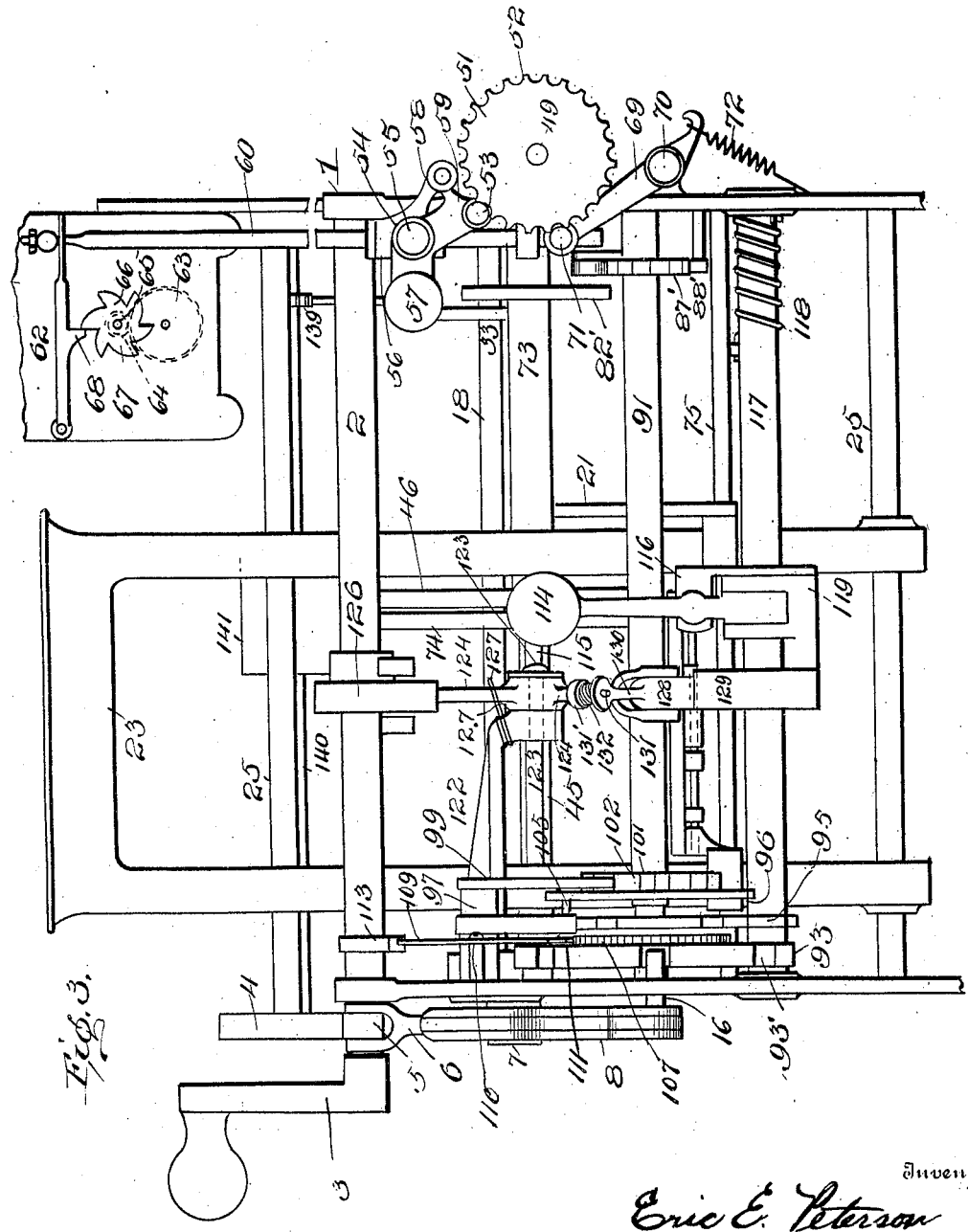

No. 834,487. PATENTED OCT. 30, 1906.
E. E. PETERSON.
WORKMAN'S TIME RECORDER.
APPLICATION FILED JAN. 31, 1905.
9 SHEETS—SHEET 5.
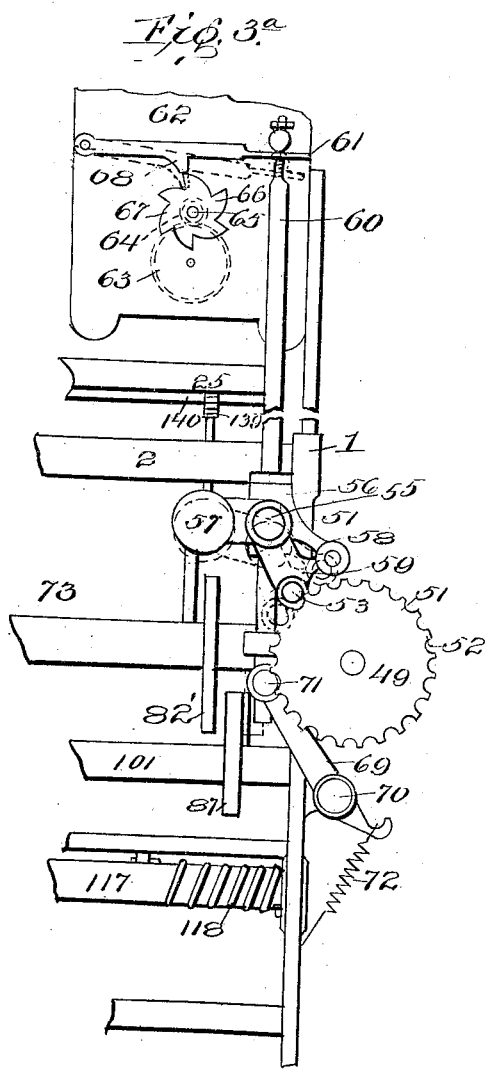
Witnesses
J M Fowler Jr
Edgar M Kitchin
Inventor
Eric E Peterson,
By  Attorneys No. 834,487. PATENTED OCT. 30, 1906.
E. E. PETERSON.
WORKMAN'S TIME RECORDER.
APPLICATION FILED JAN. 31, 1905.
9 SHEETS—SHEET 6.
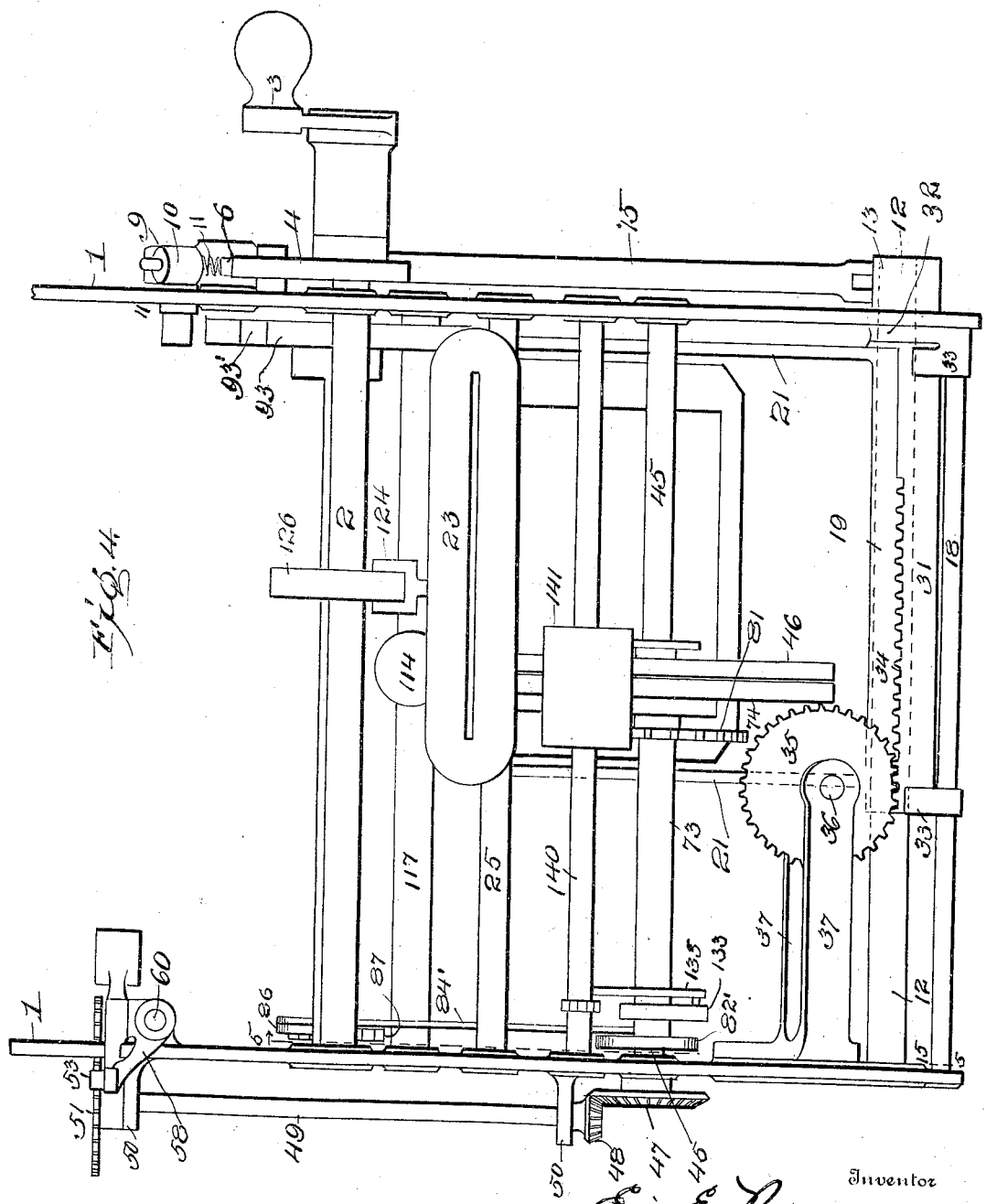

No. 834,487.
PATENTED OCT. 30, 1906.
E. E. PETERSON.
WORKMAN'S TIME RECORDER.
APPLICATION FILED JAN. 31, 1905.
9 SHEETS—SHEET 7.
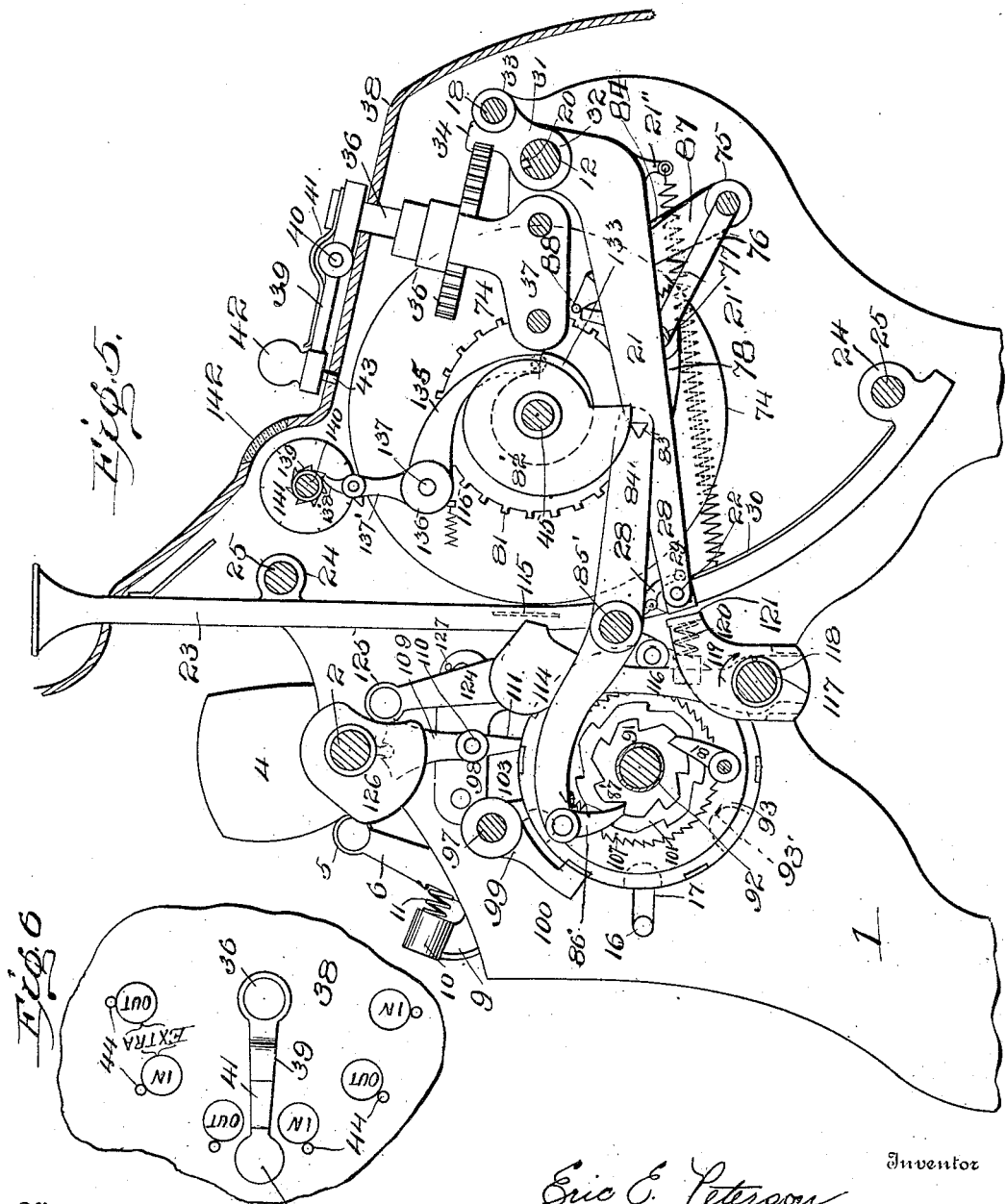
Witnesses
J. M. Fowler Jr.
Edgar M. Kitchin
Inventor
Eric E. Peterson,
By Mason, Fenwick & Lawrence
Attorneys.

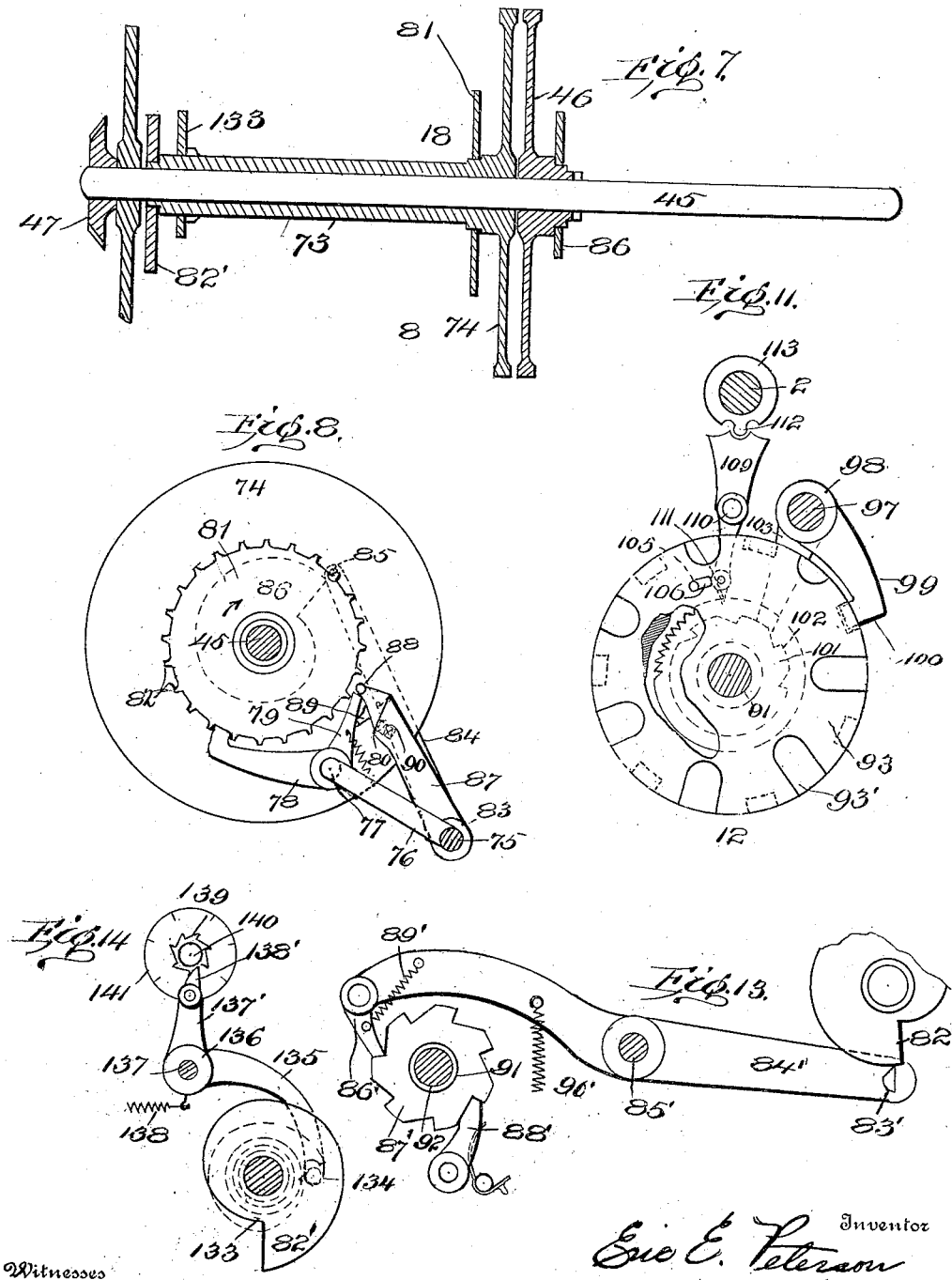

No. 834,487. PATENTED OCT. 30, 1906.
E. E. PETERSON.
WORKMAN'S TIME RECORDER.
APPLICATION FILED JAN. 31, 1905.
9 SHEETS—SHEET 9.
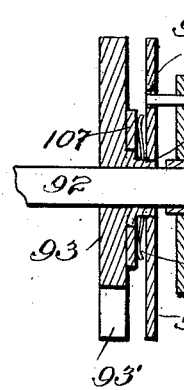
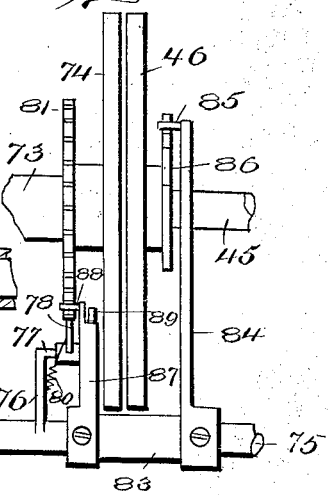
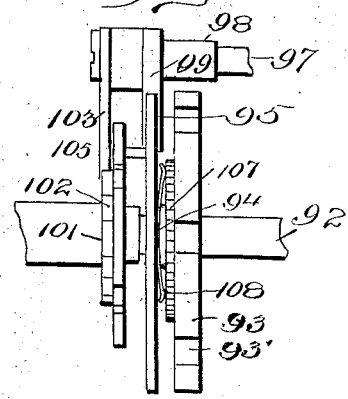
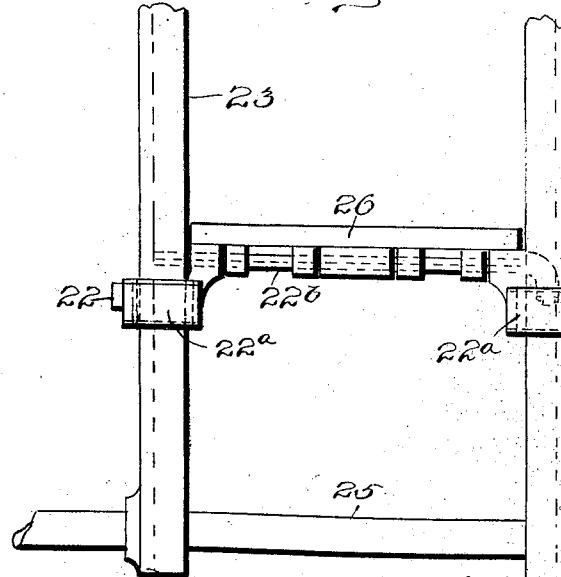
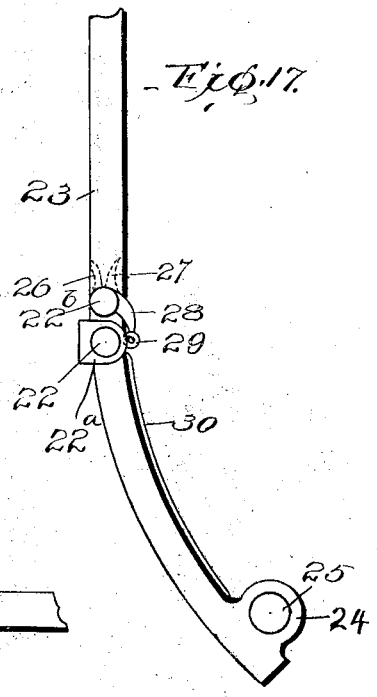
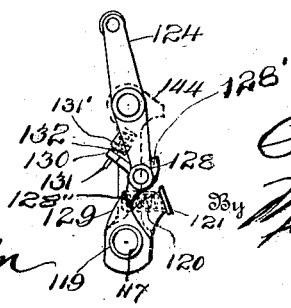
Witnesses
J. M. Fowler Jr
Edgar M. Kitchin
Inventor
Eric E. Peterson
By Mason Fenwick Lawrence
Attorneys ated October 30, 1906.

UNITED STATES PATENT OFFICE.

ERIC E. PETERSON, OF BINGHAMTON, NEW YORK, ASSIGNOR OF ONE-FOURTH TO ARTHUR W. ALEXANDER, OF BINGHAMTON, NEW YORK, AND ONE-FOURTH TO JOHN E. JENKINS, OF WILKES-BARRE, PENNSYLVANIA.

WORKMAN'S TIME-RECORDER.

No. 834,487.        Specification of Letters Patent.        Patented Oct. 30, 1906.

Application filed January 31, 1905. Serial No. 243,572.

*To all whom it may concern:*

Be it known that I, ERIC E. PETERSON, a citizen of the United States, residing at Binghamton, in the county of Broome and State of New York, have invented certain new and useful Improvements in Workmen's Time-Recorders; and I do hereby declare the following to be a full, clear, and exact description of the invention, such as will enable others skilled in the art to which it appertains to make and use the same.

This invention relates to improvements in recorders, and is particularly directed to mechanism adapted for recording various times of entry and exit of workmen.

The object in view is the provision of means for recording the time of arrival and departure of workmen, and in carrying out this object I employ a printing mechanism, means for producing a printing operation thereof, means for adjusting said printing mechanism relative to the respective time of its operation, and means for adjusting the sheet printed upon also relative to the time of the operation.

With further detail objects in view the invention comprises certain novel constructions, combinations, and arrangements of parts, as will be hereinafter fully described and claimed.

In the accompanying drawings, Figure 1 represents a perspective view of a mechanism embodying the features of the present invention. Fig. 1ª represents a view in elevation of one side of the same. Fig. 2 represents a similar view of the opposite side thereof. Fig. 3 represents a front elevation of the same. Fig. 3ª represents a detail view of the timing mechanism, the parts being illustrated in full lines in the position assumed just prior to an operation and the parts being illustrated in dotted lines just after the completion of an operation. Fig. 4 represents a top plan view of the parts seen in Fig. 3, the covering being omitted for permitting disclosure of interior structure and part of the timing mechanism being omitted. Fig. 5 represents a transverse vertical section taken on the plane of line 5 5 of Fig. 4 and looking in the direction of the arrow. Fig. 6 represents a top plan view in detail of the card-adjusting mechanism operating-crank and its several points. Fig. 7 represents an enlarged detail fragmentary sectional view through the printing-wheels and actuating parts. Fig. 8 represents a section taken on the plane of line 8 8 of Fig. 7. Fig. 9 represents an edge view of the parts seen in Fig. 8. Fig. 10 represents a detail edge view of the day-wheel and operating parts detached. Fig. 11 represents a detail sectional view showing the day-wheel and operating parts in elevation, parts being broken away for disclosing interior structure. Fig. 12 represents a transverse vertical section taken through the day-wheel. Fig. 13 represents a similar view to Fig. 11 of the actuating mechanism for the day-wheel shaft. Fig. 14 represents a similar view of the day-indicator and operating parts. Fig. 15 represents a card showing the preferable arrangement of time-columns adapted for use in connection with the present improved mechanism. Fig. 16 represents a detail front view of the card-clamp and surrounding parts. Fig. 17 represents a side elevation of the same. Fig. 18 represents a detail view of the hammer and its operating mechanism.

In carrying out the present invention in practical form I preferably embody the same as seen in detail in the accompanying drawings, in which 1 indicates a suitable framework supporting the operating parts, within which framework is journaled a shaft 2, extending transversely across the rear thereof. A crank or other suitable operating means 3 is connected with the shaft 2 for facilitating actuation of said shaft, and said shaft rigidly carries near that end carrying crank 3 a cam 4, adapted in operation to engage the antifriction-pulley 5, journaled in the end of a lever 6. The lever 6 is journaled at the end opposite that carrying roller 5 on a stub-shaft 7, carried by frame 1. A lever 8 is also journaled on the shaft 7 and normally lies at a straight angle with respect to the lever 6, said lever 8 being provided with a laterally-projecting bracket 9, formed with a socket 10, inclosing one end of a spring 11, said spring 11 having its opposite end engaging the lever 6, so that in operation when the lever 6 is pressed rearwardly the spring 11 is adapted to be compressed for exerting pressure upon the bracket 9 and swinging the lever 8 forwardly. A shaft 12 is journaled transversely in the frame 1 at the rear thereof, and a crank-arm 13 depends from the end of said shaft, said crank being provided with a wrist-pin 14, engaged by a link 15, extending rearwardly and carrying at its rear end a pin 16, extending through a slot 17, formed in the side of the frame 1. The slot 17 is arranged in the horizontal plane of the lower end of lever 8, and said lower end is preferably curved to fit the contour of the end of link 15, so that when said lever is actuated said link is adapted to be moved longitudinally, subject to the movement of the lever. A fixed shaft 18 is arranged transversely of the framework 1 parallel to and spaced slightly above and in the rear of the shaft 12. A sleeve 19 is feathered onto the shaft 12, free to move longitudinally thereof, but is retained by a suitable key 20 from rotation independently of said shaft. An arm 21 extends rearwardly and downwardly from each end of the sleeve 19, the free ends of said arms carrying journals 22, projecting laterally from boxes 22$^a$, slidingly inclosing the sides of a card-chute 23, said boxes carrying a shaft 22$^b$, extending transversely of the chute 23. The chute 23 is supported within the framework 1 by means of eyes 24 24, slidably surrounding shafts 25 25, fixed within the framework 1, whereby the chute 23 is adapted to be moved laterally while held against vertical movement. The arms 21 are arranged to extend to the opposite edges of the chute 23, so that lateral movement of arms 21 is adapted to move said chute correspondingly, the said arms 21, however, being free to swing vertically independently of the chute. A spring 21' is connected to frame 1 at one end and at its other end engages a lug 21'', extending from one end of arms 21, said spring being designed for effecting return of the parts after an operation thereof. The shaft 22$^b$ carries a fixed jaw 26 and a pivoted jaw 27, said jaws opening upwardly and positioned for receiving a card deposited in the upper end of chute 23. The pivoted jaw 27 is provided with an arm 28 at one end, carrying a roller 29, adapted to engage a cam-surface 30 upon the respective edge of the lower portion of the chute 23, said cam extending longitudinally of the side of the chute for producing an elevation of the arm 28 when the shaft 22$^b$ is swung downwardly for producing a clamping action of the jaws 26 and 27 and for retaining the same in a clamping position as long as the shaft 22$^b$ is held in its lowered position. A carriage 31 is arranged to move transversely of the frame in the rear thereof and is carried by eyes 32, surrounding shaft 12 outside the ends of the sleeve 19, and similar eyes 33 inclosing shaft 18. The carriage 31 is provided with a longitudinal rack 34, meshing with an actuating-pinion 35, fixed to a shaft 36, journaled in brackets 37 37, projecting inwardly from one side of the framework 1. A suitable cover or casing 38 is preferably arranged above the main portion of the mechanism, and the shaft 36 extends through said cover 38 and is provided with an actuating-crank 39, said crank being hinged, as at 40, intermediate its length and provided with a spring 41, extending longitudinally thereof and depressing the free end of said crank and normally retaining the same in a lowered position. The free end of the crank 39 is provided with an operating-handle 42 and a lug 43, projecting in the opposite direction from the handle 42 and adapted to engage notches 44 44, arranged at various points in the cover 38. Thus it will be seen that the knob 42 of crank 39 may be elevated until the lug 43 is free from engagement with any of the notches 44, and the said handle may then be swung at will, movement of the handle actuating gear 35 and driving the rack 34 longitudinally with respect to itself and transversely with respect to the framework 1, such movement of the rack of course effecting a similar movement of the carriage and its eyes 32, which actuate the sleeve 19 and parts connected therewith above described.

The notches 44 may be in any suitable number and may be provided with indications—such, for instance, as "in" or "out," as indicated in Fig. 6 of the drawings, to correspond with similar indications upon the card illustrated in Fig. 15 of the drawings.

A shaft 45 is journaled transversely of the framework 1 in the front of the chute 23, and said shaft carries a printing-wheel 46, fixed thereto and having upon its periphery type-numerals ranging from "1" to "59," inclusive, and one type-numeral representing two ciphers, ("00,") all of said type-numerals being spaced apart equidistant throughout said periphery, so that in operation when said disk 46 is rotated with a step-by-step movement, as hereinafter fully described, the time in minutes may be printed upon a card brought in contact with the periphery of said disk. The disk 46 is rotated with the shaft 45 and is designed to make one complete revolution each hour, the type-numerals upon the periphery of said disk representing the minutes of the hour, and said disk will hereinafter therefore be called the "minute-wheel."

One end of shaft 45 projects beyond its bearing in the frame 1 and carries a suitable beveled gear-wheel 47, meshing with a beveled gear-wheel 48, carried by a shaft 49, journaled in brackets 50 50, projecting laterally from the side of the frame 1. As seen in Fig. 3, the shaft 49 carries a wheel 51 at its end opposite the end carrying gear-wheel 48, the wheel 51 being provided with a plurality of radial teeth 52, spaced apart a distance sufficient for receiving therebetween an actuating-pin 53, carried by the lower end of an elbow-lever 54, which lever is pivoted, as at 55, to a weighted block 56, the upper or free end of the lever 54 being provided with a weight 57 and the lower end of said lever being retained in its lowered position by an arm 58, projecting laterally from the block 56 and adapted to contact with a lug 59, projecting laterally from the lower end of the lever 54. The weight 57 thus in operation tends to retain the lug 59 in contact with the lower end of the arm 58, said arm 58 serving to prevent too great elevation of the lower arm of said elbow-lever. The block 56 is fixed to a vertically-moving shaft 60. The upper end of the shaft 60 is engaged by the free end of a pivotally-mounted lever 61, carried by a suitable casing 62, suitably supported above the framework 1. The casing 62 is adapted to contain ordinary clock mechanism, (not illustrated,) the hour-shaft of such clock mechanism carrying a pinion 63, provided with sixty teeth, meshing with a pinion 64, having six teeth. The pinion 64 is fixed to a shaft 65, carrying a cam-wheel 66, provided on its periphery with six cams 67, the periphery of said wheel 66 being engaged by a depending lug 68, carried by lever 61, the lever 61 being arranged above the cam-wheel 66. Thus it will be seen that in operation when the wheel 63 is rotated by the clock mechanism, above mentioned, but not illustrated, said wheel will make a complete revolution in an hour, and its sixty teeth meshing with the six teeth of pinion 64 will cause the same to rotate ten times during the hour, whereby the cam-wheel 66 is also caused to rotate ten times during the hour, and each time the wheel 66 rotates the lever 61 is elevated and dropped six times, once for each of the cams 67, so that with each revolution of the wheel 63 the lever 61 will be raised and dropped sixty times, the dropping of the lever 61 being timed by the division of the cam-wheel 64 into the six equal cams 67, so that the vertical shaft 60 will be reciprocated once each minute. It is to be observed that as the cam-wheel 66 rotates the engagement of one of its cams with the lug 68 will cause a gradual elevation of the lever 61, and when the lug 68 arrives at the end of the cam the lever will be permitted to drop suddenly. A detent-lever 69 is journaled on a bracket 70, projecting from the frame 1, and said lever is provided with a pin 71, of approximately the same size as pin 53, said pin 71 being normally held in contact with the wheel 51 between two of the teeth 52 by means of a retention-spring 72 engaging the lower free end of the lever 69, so that in operation the wheel 52 may be rotated when sufficient pressure is brought to bear upon the same for causing the pin 71 to ride over the teeth 52, and said wheel 51 will be held stationary at all other times. Now it is to be observed that when the shaft 60 is raised by the action of the cam-wheel 66 and lever 61 the pin 53 will leave its engagement with the wheel 51 between the teeth 52, move outwardly sufficiently to clear the next upper tooth 52, and after clearing said tooth will swing laterally under the action of weight 57 until the lug 59 contacts with arm 58. When the parts have been elevated to their highest position, as indicated in full lines in Fig. 3ª, the lug 68 is just ready to drop off of the particular cam 67 which it engages. As the said lug drops off the said cam the parts assume the position indicated in Fig. 3, the pin 52 coming in contact with the wheel 51, above the tooth over which it rode when being elevated, and the weight of the block 56 and other parts is sufficient for causing the parts to continue their descent until the pin 53 assumes the position indicated in dotted lines in Fig. 3ª. It will thus be seen that the wheel 51 is actuated with a step-by-step movement, one step being taken at the expiration of each minute, and each step of the wheel 51 causes a correspondingly forward step of the gear 47 and the shaft 45, whereby the minute-wheel 46 is fed forwardly.

A sleeve 73 surrounds the shaft 45 and extends from the minute-wheel 46 to that side of the framework 1 opposite the side upon which the link 15 is arranged. The sleeve 73 at its inner end carries a disk 74, provided on its periphery with twenty-four type-numerals, arranged in two series of from "1" to "12," inclusive, and spaced apart equidistant upon the periphery of said disk, the said disk being adapted to be rotated with a step-by-step movement, one step being taken each hour, as will be hereinafter fully set forth, so that said type-numerals indicate the hours of the day, and said disk will hereinafter be known as the "hour-wheel." A shaft 75 is rigidly mounted transversely of the framework 1 parallel to and below and in the rear of shaft 45. A bracket or arm 76 extends upwardly and forwardly from the shaft 75 and is provided with a laterally-projecting pin 77, upon which is journaled a pawl 78. Projecting from the pivoted end of the pawl 78 and approximately at a right angle to the body of the pawl is a finger 79, which lies outside the vertical plane of the pawl and is connected by a spring 80 with the arm or bracket 76, whereby said pawl is normally retained with its free end in contact with the periphery of a disk 81, fixed to the sleeve 73, contiguous to the hour-wheel 74. The periphery of the wheel 81 is provided with twenty-four teeth 82, dividing said periphery into twenty-four spaces, the spaces between each two of said teeth being of a size adapted to receive the free end of the pawl 78, said pawl being designed to normally have its free end lying between two of said teeth for retaining the disk 81 against movement. A sleeve 83 is rotatably mounted upon the shaft 75 and carries an arm 84, extending upwardly and forwardly therefrom. The arm 84 is provided with a laterally-projecting pin 85, resting upon a cam 86, fixed to the hub of the minute-wheel 46. An arm 87 extends from the sleeve 83 at one side of the plane of and toward the disk 81, said arm 87 being provided with a finger 88 at its end, adapted in operation to engage the teeth 82 of wheel 81, one at a time, for causing said wheel to move forwardly. A pawl 89 is pivoted to the arm 87 in a vertical plane lying between the disk 81 and the hour-wheel 74, said pawl occupying the vertical plane of finger 79 and being adapted to engage the same when the arm 87 is moved for actuating the wheel 81, such movement occurring at the time the pin 85 of arm 84 drops off the shouldered portion of the cam 86. The pawl 89 is pressed outwardly by a spring 90 and is limited in its outward movement by a suitable shoulder formed on the pawl in the rear of its pivot and designed to engage the arm 87. Thus in operation it will be seen that when the minute-wheel 46 has completed a revolution, starting with the two cipher type-numeral and ending with the "59" type-numeral, the cam 86 will have completed a revolution and will permit the finger 85 to drop down the shouldered portion of such cam, causing the sleeve 83 to be rotated and the arm 87 swung in such manner as to cause engagement of the pawl 89 with the finger 79 for causing the pawl 78 to be moved pivotally out of contact with the disk 81, whereupon the finger 88 engages one of the teeth 82 and actuates the disk 81 one step. Thus it will be seen that as the minute-wheel rotates step by step the same will upon completing a rotation impart a step of rotation to the hour-wheel, the hour-wheel moving in an opposite direction to the movement of the minute-wheel.

The sleeve 73 carries at its outer end next to the frame 1 a cam 82', the periphery of which cam is engaged by a lug 83', projecting laterally from a lever 84', pivoted intermediate its length upon a stub-shaft 85', extending inwardly from the side of frame 1. The lever 84' extends to a point near the front of the framework and carries at its front end a pivotally-mounted pawl 86', adapted in operation to engage a ratchet-wheel 87' for actuating the same, said ratchet-wheel being normally held against rotation by any suitable detent 88'. A spring 89' is carried by the lever 84' and engages pawl 86' for causing the free end to normally lie contiguous to the under edge of the lever, but permitting the same to swing downwardly and outwardly for purposes hereinafter specified. A spring 90' is fixed to the side of the frame 1 at one end and at the other engages the front end of lever 84', so that in operation when the cam 82' has completed a rotation and the lug 83' slips off the shoulder of said cam the lever will be swung upon its pivot under the action of the spring 90' and the lug 83' caused to engage the portion of the periphery of the cam 82' having the shortest radius—that is to say, the lug will be caused to drop off the shoulder and moved up into contact with the smaller portion of the cam.

The ratchet-wheel 87' is provided with seven ratchet-teeth, and in operation when the spring 90' is permitted to draw the free or front end of lever 84' downwardly the pawl 86' engages one of said ratchet-teeth and causes the ratchet to move downwardly one step, the detent 86' lifting against the pressure of its retaining-spring and dropping into contact with the next succeeding tooth. The ratchet-wheel 87' is carried by and fixed to the sleeve 91, rotatably surrounding and supported by a shaft 92, rigidly fixed in the framework 1 transversely thereof and approximately in the vertical plane of shaft 2 and below the same. A disk 93 is rotatably mounted upon the shaft 92 and is provided with seven radial notches 93', being graduated from the deepest at one point of the periphery of the disk to the shallowest at a point contiguous thereto. All of said notches are equally spaced apart and regularly arranged in succession. The said notches are adapted, as will hereinafter appear, to control actuation of the parts relative to the day of such actuation, and the said disk 93 will therefore hereinafter be called the "day-wheel." The disk 93 is mounted contiguous to the side wall of the frame 1, formed with the slot 17, and said disk is adapted to have its notches 93' brought successively into register with said slot, so that pin 16, which extends through and beyond said slot, may enter said notches during the longitudinal travel of the link 15, and said notches are in practice adapted to limit the extent of longitudinal movement of the pin 15, as will hereinafter more fully appear. The disk 93 is provided with a laterally-extending sleeve or boss 94, surrounding the shaft 92. To the boss 94 is fixed a locking-disk 95, provided with seven radial notches 96, arranged at such points on the periphery of the disk 95 as to come opposite the center of the periphery of the disk 93 between two of the notches 93'. A stub-shaft 97 projects inwardly from one of the sides of frame 1 just above the day-wheel 93 and disk 95 and carries a rotatably-mounted sleeve 98.

Extending from the sleeve 98 is a dog 99, provided with a nose 100, adapted in operation to engage the notches 96 for normally locking the disk 95 against rotation. A cam-wheel 101 is fixed to the end of the sleeve 91, and said cam-wheel is provided with seven cams 102 of equal size and projecting from the periphery of said wheel. A finger 103 is carried by the sleeve 98 and projects downwardly into contact with the periphery of wheel 101, positioned for being actuated by the cams 102, the weight of the free end of dog 99 being sufficient for retaining the finger 103 in contact with the surface of the periphery of the wheel 101. The cam-wheel 101 carries a disk 104, provided with a laterally-projecting pin 105, extending into a segmental slot 106, formed in the disk 95. Rotatably surrounding the sleeve 94 and interposed between the day-wheel 93 and the disk 95 is a fine-tooth ratchet-wheel 107, pressed against and caused to frictionally engage the disk 93 by means of a suitable spring or springs 108, which normally engage the disk 95 at one side and at the other side engage the ratchet 107, said springs having an expanding tendency, and the frictional contact between the parts is sufficient for causing the disk 95 and wheel 93 to rotate when the dog 99 has its head 100 out of engagement with the disk 95, and said fine-tooth ratchet-wheel 107 is rotated; but when the dog 99 engages the disk 95 the ratchet-wheel 107 may be rotated to any extent without rotating the other parts. A lever 109 is pivotally mounted on a stub-shaft 110, projecting inwardly from one of the sides of frame 1 and extending downwardly between the day-wheel 93 and the disk 95, and the lower end of said lever carries a pivotally-mounted pawl 111, held by a shoulder against movement in one direction, but free to pivot in the opposite direction, so that said pawl is adapted when the lever 109 is swung in one direction to ride over the teeth of ratchet-wheel 107, and when said lever is swung in the opposite direction said pawl is designed to effect rotation of said ratchet-wheel. The upper end of the lever 109 is preferably provided with a segmental notch, into which extends a finger 112, carried by a sleeve 113, fixed to shaft 2, whereby operation of the shaft 2 by the crank 3 is designed to cause movement of the lever 109 for producing rotation of the ratchet-wheel 107.

It will thus be observed that when the hour-wheel 74 has completed a revolution or, in other words, completed a cycle of twenty-four hours the cam 82' will move to a point for permitting lug 83' to drop off the shoulder of said cam, whereupon the lever 84', under the action of spring 90', will have its free end swung downwardly. This movement will effect one step of rotation of the ratchet-wheel 87' and the corresponding rotation of the sleeve 91. This step of rotation of the sleeve 91 effects similar rotation of the cam-wheel 101, causing one of the cams 102 to pass beneath the finger 103, which produces an outward movement of said finger and a similar movement of the dog 99. The slot 106 permits a sufficient movement of the pin 105 for allowing the disk 104 and the ratchet-wheel 101 to move the required distance for causing the necessary outward movement of finger 103, above described. As soon as the dog 99 has moved out of engagement with the disk 95 the forward step of the sleeve 91 is complete. The parts stand in this unlocked position until an operator actuates the crank 3, whereupon the lever 109 produces movement of the ratchet-wheel 107 and, through the frictional engagement thereof, also moves the day-wheel 93 and the disk 95. The movement of the disk 95 produces movement of the disk 104 through the pin 105 and, with said disk 104, moves the cam-wheel 101, which latter moves to such an extent as to cause the particular cam 102 engaging the lever 103 to pass from beneath the same and permit said finger to drop to its former position. The movement of the disk 95 and the day-wheel 93 must be such before the finger 103 can drop off the cam 101 as to bring one of the notches 96 into alinement with the nose 100 of dog 99, so that when said finger 103 drops off said cam the said head will drop into said notch and lock the parts in the given position. It is to be observed that with each step of the parts just described a new notch 93' of day-wheel 93 is presented in alinement with the slot 17 in position for being engaged by the pin 16 for limiting the length of stroke of the link 15, and thereby controlling the downward movement of the clamp carried by the arms 21, the longest of said slots permitting the arms 21 to move to their lowermost position and the shortest of said slots permitting only a relatively short movement of said arms, and the intermediate slots permitting a graduated degree of increase in the amount of movement of said arms relative to the degree of increase in the depths of the notches.

The chute 23 at the point opposite the minute and hour wheels consists simply of an open framework, so that when a card, such as is shown in Fig. 15, is introduced into said chute and is caught by the gripper carried by the arms 21 the same may be given an impression by being struck with a light quick blow from the rear end by a hammer 114, said blow causing the card to strike against the type carried by the hour and minute wheels or against a carbon ribbon 115, arranged between said card and said wheel, producing the desired imprint.

The ribbon 115 may be carried by suitable spools mounted upon the chute 23 and rotated after the manner of a type-writer ribbon or in any other preferred manner, or inking-rolls may be provided for supplying ink to the type on the minute and hour wheels; but for compactness I prefer ribbon 115. The hammer 114 is carried by a handle 116, having its lower end rotatably surrounding a shaft 117. The shaft 117 is journaled in the framework 1 transversely thereof and is surrounded by a coiled spring 118, (best seen in Fig. 3,) said spring being fixed at one end to one side of the frame 1 and at the other end to the shaft 117, the spring 118 being secured in such position as when subjected to tension to produce a tendency toward rotation of the shaft 117 in the direction indicated by the arrow in Fig. 5, when the shaft is free to move. A bracket 119 is fixed to and surrounds the shaft 117 and incloses the lower end of the handle 116 in such manner as to permit a slight pivotal play of said hammer, as will be apparent from the dotted disclosure in Fig. 5, the hammer being normally held against such play by a spring 120 engaging a projection 121 of the bracket 119 at one end and at the other end engaging a socket formed in the handle 116, said spring 120 normally pressing the hammer in a direction away from the printing-wheels.

The bracket 122 is carried by one of the sides of the frame 1 and extends inwardly transversely of the frame and at its inner end supports a pin 123, pivotally carrying a lever 124, the upper end of which is bifurcated and carries between the arms of such bifurcation an antifriction-roller 125, in operation engaging a cam 126, carried by and fixed to the shaft 2. The spring 127 is carried by the bracket 122 and engages the lever 124 for retaining the wheel 125 at all times in contact with the periphery of the cam 126. The lower end of the lever 124 is bifurcated, as seen in Fig. 3, and pivotally carries a trigger 128, having a lug 128' normally engaging the lever 124, said trigger being formed with a point 128'', normally engaging a spur 129, projecting upwardly from and formed integral with the bracket 119. An arm 130 extends laterally from the trigger 128 and is penetrated by a pin 131, extending from the lever 124 at right angles to the arm 130. The arm 130 is formed with an aperture at the point of penetration by the pin 131 of a size sufficiently greater than the pin to permit pivotal swinging of the arm 130. The pin 131 extends longitudinally of a socket 131', formed in the lever 124, and is arranged, preferably, centrally of said socket. A coiled spring 132 surrounds the pin 131 within the socket 131' and has one end fixed to the lever 124 and the opposite end fixed to the arm 130, so that the outward pivotal movement of the arm 130 or movement away from the lever will cause expansion of the spring 132, which spring normally tends to prevent such movement of the arm 130, whereby the trigger 128 is normally retained against pivotal movement. The arrangement is therefore such that when the shaft 2 is rotated the cam 126 will cause the upper end of the lever 124 to be moved forwardly and the lower end, of course, to move in the opposite direction, whereby the point of the trigger 128 is caused to impart movement to the spur 129, the point 128'' engaging said spur and the point 128' engaging lever 124 for preventing movement of the trigger 128 upon its pivot. Movement of the lever 124 will thus cause rearward swinging of the spur 129, said spur moving in the arc of a circle, whereby when the lever 124 has nearly reached the limit of its movement the point 128'' of trigger 128 will slip over the point of the spur 129. As the point 128'' of the trigger 128 slips off the point of the spur 129 the parts are free to return to their former position under the action of the spring 118. The spring 118 acts with sufficient force for causing the hammer 114 not only to return to its former position, but to pass beyond its normal position against the pressure of spring 120 until the said hammer contacts with the card contained within the chute 23 and drives the same into contact with the ribbon interposed between the card and the minute and hour wheels with sufficient force for causing an impression upon said card. As soon as the stroke has been accomplished the spring 120 causes the hammer to move back to its normal position.

The cam 133 is carried by the shaft 45 and is provided with a single shoulder similar to cam 82', said cam 133 being engaged by a pin 134, extending outwardly from an arm 135, fixed to a sleeve 136. The sleeve 136 is journaled upon a stub-shaft 137, projecting inwardly from one side of frame 1. A spring 138 engages the sleeve 136 for retaining the pin 134 of lever 135 in contact with the periphery of the cam 133. An arm 137' extends upwardly from the sleeve 136 and carries at its upper end a pivotally-mounted pawl 138', said pawl being provided with a suitable shoulder for preventing the same from moving past a given point in one direction, but leaving the same free to swing in the opposite direction. A ratchet-wheel 139 is carried by a rotatably-mounted shaft 140, rotatably mounted transversely of the framework 1. The shaft 140 carries a drum 141, divided off into seven sections, one for each day of the week, and each section preferably containing the name of one of the days of the week, so that as said drum is rotated the names of the successive days of the week will appear opposite a window 142 in the cover 138. Thus in operation each time the hour-wheel completes a rotation the pin 134 will drop off the shoulder of the cam 133 and, through the mechanism described, produce a forward step of the drum 141, and the said drum will thus always show the day for which the machine is set.

In Fig. 15 I have illustrated the preferred form of card adapted for use in connection with the present improved recorder, and the salient points of the card consist of the arrangement of vertical columns for indicating certain divisions of a day and the horizontal columns for indicating divisions of a week. More specifically, the card is preferably outlined by having two vertical columns marked "Forenoon," one of the "Forenoon" vertical columns being marked "In" and the other "Out," the "In" column being designed to receive an impression from the machine, showing the time of arrival in the forenoon of the party carrying the card. The column marked "Out" is designed to receive indications of the time the person possessing the card left work at noon. A second set of two vertical columns is provided and marked "Afternoon," one of said columns under "Forenoon" being marked "In" and the other of said columns being marked "Out," the first being designed to receive indications of the time of return of the holder of the card in the afternoon and the column marked "Out" being designed to receive indications of the time of departure in the evening. For convenience a set of two vertical columns may be provided and marked "Extra," and under the word "Extra" one of the columns marked "In" and the other marked "Out" for indicating the time of arrival and departure of the holder of the card outside of the regular business hours. There may also be provided a total column, which may be fitted up for indicating the total time of the workman. The card is, as above suggested, divided into a series of horizontal columns which run transversely of the vertical columns, and each is adapted to have a heading indicating one of the days of the week—that is to say, the first column is marked "M." for Monday, "Tu." for Tuesday, "W." for Wednesday, &c., throughout the week. Thus each of the horizontal columns covers one day of the week and includes the coming in and going out as often as such going and coming occur in any one day, and each of the vertical columns indicates either the coming in or the going out for the entire week. This card of course forms no part of the present invention, but is described so that the operation of the present improved mechanism may the more readily be understood.

One complete operation of the present improved mechanism may be carried out somewhat as follows: Upon the arrival of a workman in the morning he inserts the card (seen in Fig. 15) into the chute 23, down which the card descends until it comes into engagement with the clamping device carried by the arms 21. The chute 23 constitutes a carrier for said card, and said chute is designed, as heretofore set forth, to be positioned at different points transversely of the framework for presenting different vertical columns of the card to the minute and hour wheels. Therefore, in order that the printing operation upon the card may be made to appear in the "In" vertical column of the "Forenoon" set of columns, the operator positions the crank 39 with the lug 43 in the aperture 44 corresponding to the first point marked "In," as seen in Fig. 6. As soon as the chute has thus been positioned the operator grasps the crank 3 and rotates the same, which, through cam 4 and levers 6 and 8, actuates link 15, and, through the crank 13, rocks the shaft 12. The rocking of shaft 12 causes the descent of the arms 21, which descent produces a clamping action of the clamp carried by said arms, due to the engagement of the roller 29 with cam-surfaces 30, whereby the card is drawn downwardly to a distance relative to the amount of rotation imparted to the shaft 12. The amount of rotation of the shaft 12 must of course be relative to the amount of longitudinal movement imparted to the link 15, and said link will move to any extent which may be permitted, subject to the control of the pin 16, extending through the slot 17 and into one of the notches 93' of the day-wheel 93. For illustration suppose that the arrival of the particular workman operating the machine is on Monday morning. The day-wheel will be positioned with the deepest slot in line with the slot 17, and the link 15 will therefore be permitted to move to its greatest extent. The arms 21 must therefore have their free ends travel downwardly to the lowermost point of their movement, carrying the card just dropped in the chute 23 downwardly until the highest point of the card to be printed is opposite the desired type of the minute and hour wheels and also opposite the hammer 114. This point will be within the horizontal column indicated by the letter "M.," or the Monday horizontal column. The chute 23 has already been moved laterally to the required extent for presenting the vertical column of the card marked "In" under the general heading "Forenoon" opposite the type of the hour and minute wheels and also opposite the hammer 114, which positioning of the card insures the printing being done within the square formed by the crossing of the said vertical and horizontal columns. Therefore the printed indication will be that of the time of arrival in the forenoon of Monday. After the card has been thus positioned the cam 126 actuates lever 124 and produces actuation of the hammer 114, as above described. As soon as the print has been made upon the card by the stroke of the hammer the parts are in position for a second operation, it being understood, of course, that the trigger 128 after slipping over the spur 129 is backed over said spur to its former position, permitted by the further movement of the cam 126 and effected through the actuation imparted to the lever 124 by the spring 127. As soon as this operation is completed the operator may manually remove the card, the said card being returned to its raised position by the arms 21 under the action of the spring 21', connected at one end to the frame 1 and at the other end to the lug 21", projecting downwardly from one of the arms 21. The spring 21' is thus arranged for elevating the arms 21 as soon as the cam 4 is swung to a position for permitting return of the levers 6 and 8, whereby the parts are designed to be restored to their former position and are ready for a second operation as soon as the introduced card within the chute has been removed.

After the first operation is complete a second operation may be carried out in exactly the same manner as the first, and so on throughout the day, the crank 39 being adjusted to the various points of "In" and "Out" relative to the time of day of the operation, and the operation of the clock-actuated mechanism, as above described, continues throughout the day and at midnight releases the day-wheel above mentioned. The clock-actuated mechanism also shifts the drum 141 for indicating the next day. The day-wheel is thus in a released condition, and so remains until the machine is operated for the first time during Tuesday, it being presumed that the operation above described was on Monday. The first operation of the machine on Tuesday will effect the swinging of the lever 109 and the positioning of the day-wheel with the next to the deepest notch 93' in register with the slot 17.

While I have fully set forth all the details of one embodiment of the present improved mechanism I shall of course feel at liberty to deviate therefrom with respect to size, shape, and arrangement of the minor parts and, in fact, to any extent within the spirit and scope of the present invention.

Having thus fully described my invention, what I claim as new, and desire to secure by Letters Patent, is—

1. In a time-recorder, the combination with a framework, of time-recording mechanism arranged therein, a carriage movable contiguous to said time-recording mechanism and adapted to carry a sheet designed to receive records from said time-recording means, an arm engaging said carriage, and means for moving said arm bodily, laterally for actuating the carriage, and means for swinging said arm pivotally for governing the positioning of the sheet within the carriage.

2. In a time-recorder, the combination with a framework, of time-recording mechanism arranged therein, a carriage movable contiguous to said time-recording mechanism, and adapted to carry a sheet designed to receive records from said time-recording mechanism, an arm engaging said carriage, means for moving said arm pivotally, means for moving said arm independenly of its pivotal movement for moving said carriage, and means carried by said arm and adapted to engage said sheet for moving the same when the arm is moved pivotally.

3. In a time-recorder, the combination with a framework, of time-recording mechanism therein, a sheet-supporting carriage horizontally movably arranged therein, a horizontally and vertically movable arm engaging said carriage, engaging means carried by said arm, and means for actuating said arm.

4. In a time-recorder, the combination with a framework, and time-recording means arranged therein, a carriage movable contiguous to said time-recording mechanism, and adapted to carry a sheet designed to receive records from said time-recording mechanism, a cam-surface carried by said carriage, an arm movable longitudinally of said cam-surface, a clamp carried by said arm and adapted to engage said sheet for moving the same when said arm is moved, and means adapted to engage said cam for operating said clamp.

5. In a time-recorder, the combination with a framework, of time-recording mechanism arranged therein, a carriage movable in front of said time-recording mechanism and adapted to carry a sheet designed to receive records from said time-recording mechanism, an arm engaging said carriage, a clamp carried by said arm and designed to engage said sheet, and means for moving said arm in a plurality of directions.

6. In a time-recorder, the combination with a framework and time-recording mechanism arranged therein, of a carriage movable in front of said time-recording mechanism and adapted to carry a sheet designed for receiving records from said time-recording mechanism, an arm engaging said carriage, gripping means carried by said arm and adapted to engage said sheet, means for moving said arm for actuating said carriage, and means for moving said arm independently of the carriage for actuating said sheet.

7. In a time-recorder, the combination with a framework, of a time-recording mechanism arranged therein, a carriage movable past said time-recording mechanism and adapted to carry a sheet designed for receiving records from said time-recording mechanism, means for actuating said carriage, and means carried by said actuating means for moving said sheet independently of the carriage.

8. In a time-recorder, the combination with a framework, of time-recording mechanism arranged therein, a chute movable transversely of said framework contiguous to said time-recording mechanism adapted to receive a sheet designed to receive records from said time-recording mechanism, gripping means arranged intermediate the length of said chute, means for moving said chute, and means for moving said gripping means longitudinally of the chute.

9. In a time-recorder, the combination with a framework, of a time-recording mechanism arranged therein, a chute movably mounted in said framework contiguous to said time-recording mechanism, clamping means movable longitudinally of said chute, means for moving said chute, means for moving said clamping means, and means carried by said chute for effecting a clamping action of said clamping means.

10. In a time-recorder, the combination with a framework, of time-recording mechanism arranged therein, a chute movably mounted in said framework contiguous to said time-recording mechanism, arms extending upon opposite sides of said chute, a clamp carried by said arms interposed in the length of said chute, means for moving said arms transversely, and means for swinging said arms.

11. In a time-recorder, the combination with a framework, of time-recording mechanism arranged therein, means for carrying a sheet designed to receive records from said time-recording mechanism, an arm engaging said sheet-carrying means, a rock-shaft supporting said arm, means for rocking said rock-shaft, and means for moving said arm laterally.

12. In a time-recorder, the combination with a framework, of a time-recording mechanism arranged therein, a support for a sheet adapted to receive records from said time-recording mechanism, an arm engaging said support, means for swinging said arm, means controlling the distance of the swing of said arm, and means for moving said support independently of the movement imparted thereto by the swing of said arm.

13. In a time-recorder, the combination with a framework, and time-recording mechanism arranged therein, of a support for a sheet adapted to receive records from said time-recording mechanism, a rock-shaft, a sleeve feathered thereon, means connecting said support with said sleeve, means for rocking said shaft, and means for moving the sleeve longitudinally of the shaft.

14. In a time-recorder, the combination with a framework and time-recording mechanism arranged therein, of a support for a sheet designed to receive records from said time-recording mechanism, a rock-shaft mounted in said framework, a sleeve feathered on said rock-shaft, an arm extending from said sleeves carrying said support, means for moving said rock-shaft, and means for moving said sleeve independently of the movement imparted thereto from said rock-shaft.

15. In a time-recorder, the combination with a framework and time-recording mechanism arranged therein, of a rock-shaft, a sleeve feathered onto the same, a support carried by said sleeve and adapted to carry a sheet designed to receive records from said time-recording mechanism, means for moving said rock-shaft, and means for moving the sleeve independently of the movement of said rock-shaft.

16. In a time-recorder, the combination with a framework and time-recording mechanism arranged therein, of a rock-shaft mounted in said framework, a sleeve feathered onto the same, a support for a sheet designed to receive records from said time-recording mechanism, means carried by said sleeve engaging said support, a rack engaging said sleeve, a pinion meshing with said rack, and means for rocking said rock-shaft.

17. In a time-recorder, the combination with a framework and time-recording mechanism arranged therein, of a support adapted to carry a sheet designed to receive records from said time-recording mechanism, a rock-shaft, a sleeve feathered thereon, connections between said sleeve and support, a rack connected with said sleeve, a pinion meshing with said rack, means for rotating said pinion, and means for locking the pinion at various points of rotation.

18. In a time-recorder, the combination with a framework and time-recording mechanism arranged therein, of a support for a sheet adapted to receive records from said time-recording mechanism, a rock-shaft, a sleeve feathered thereon, connections between said sleeve and support, a rack connected with said sleeve, a pinion meshing with said rack, a shaft for said pinion, a crank connected with said shaft, and means for locking said crank at different points of adjustment.

19. In a time-recorder, the combination with a framework, and time-recording mechanism arranged therein, of a support for a sheet adapted to receive records from said time-recording mechanism, a rock-shaft, a sleeve feathered thereon, connections between said sleeve and support, and means for locking said sleeve at various points of adjustment longitudinally of said rock-shaft.

20. In a time-recorder, the combination with a framework and time-recording mechanism arranged therein, of a support for a sheet adapted to receive records from said time-recording mechanism, a rock-shaft, connections between said rock-shaft and support, means for rocking said rock-shaft, and means for varying the degree of movement of the rock-shaft.

21. In a time-recorder, the combination with a framework and time-recording mechanism arranged therein, of means for adjusting a sheet with respect to said time-recording mechanism comprising a sheet-support, a rock-shaft, connections between the same, a lever for actuating said shaft, means for swinging said lever, and means for controlling the length of the swing of the lever.

22. In a time-recorder, the combination with a framework and time-recording mechanism arranged therein, of sheet-adjusting means comprising a sheet-support, a pivotally-mounted lever, a second pivotally-mounted lever, spring connections between said levers for imparting movement to the first-mentioned lever when the second-mentioned lever is actuated, and connections between the said second-mentioned lever and support.

23. In a time-recorder, the combination with a framework and time-recording mechanism arranged therein, of sheet-adjusting means comprising a sheet-support, a pivotally-mounted lever, a second pivotally-mounted lever, a spring for imparting movement from one of said levers to the other, connections between one of said levers and said support, and means for varying the length of stroke of the last-mentioned lever.

24. In a time-recorder, the combination with a framework and time-recording mechanism arranged therein, of sheet-adjusting means comprising a sheet-support, a lever, connections between said lever and sheet-support, a wheel provided with a plurality of notches of varying depths, means connected with said lever for adjusting said support, and means carried by said connecting means adapted to engage the notches of said wheel for controlling the length of stroke of said lever.

25. In a time-recorder, the combination with a framework and time-recording mechanism arranged therein, of sheet-adjusting means, comprising a sheet-support, a wheel provided with a plurality of notches of different depths, a pin designed to engage said notches when brought into the plane of movement thereof, means for moving said pin to the end of the notch lying within the plane of its movement, and connections between said pin and sheet-support for actuating the support when the pin is moved.

26. In a time-recorder, the combination with a framework and time-recording mechanism arranged therein, of a sheet-support, a rotatably-mounted wheel provided with a plurality of radial notches of different depth, a reciprocating pin, means for rotating said wheel, for bringing its several notches successively into the plane of movement of said pin, means for reciprocating said pin for causing the same to move for the full length of the particular notch lying within the plane of its movement, and connections between said pin and sheet-support for effecting movement of the sheet-support when the pin is moved.

27. In a time-recorder, the combination with a framework and time-recording mechanism arranged therein, of a sheet-support, means for moving said support, a link arranged outside of said framework for actuating said support-moving means, means for actuating said link, a slot being formed in said framework, a pin projecting from said link through said slot, and means for limiting the length of stroke of said pin.

28. In a time-recorder, the combination with a framework and time-recording means arranged therein, of a wheel for actuating said time-recording means, a shaft movably mounted contiguous to said wheel, timing means for reciprocating said shaft, a sleeve carried by said shaft, an arm projecting laterally from said sleeve, an elbow-lever pivoted to said sleeve, a weight carried by one arm of said lever, the other arm of said lever being designed to engage the arm of said sleeve for being retained in a lowered position, and means carried by said lower arm for engaging said wheel.

29. In a time-recorder, the combination with a framework, of time-recording mechanism arranged therein, a chute arranged contiguous thereto, and movably mounted in said framework, a cam extending longitudinally of said chute, a clamp movable longitudinally, means carried by the clamp adapted to engage said cam, for effecting a clamping action of the clamp, and means for moving said chute and the clamp.

30. In a time-recorder, the combination with a framework and time-recording mechanism arranged therein, of a rotatably-mounted wheel carried by said framework and adapted to be rotated with a step-by-step movement, means actuated by said time-recording mechanism for imparting a partial step to said wheel, means for completing said step, and sheet-adjusting means controlled in its operation by said wheel.

31. In a time-recorder, the combination with a framework and time-recording mechanism arranged therein, of a wheel rotatably mounted in said framework and adapted to be actuated with a step-by-step movement, means for locking said wheel against movement, means actuated by said time-recording mechanism for releasing said lock, means also actuated by the time-recording mechanism for imparting a partial step to said wheel, means for completing said step, and sheet-adjusting means controlled in its operation by said wheel.

32. In a time-recorder, the combination with a framework and time-recording mechanism arranged therein, of a rotatably-mounted wheel carried by said framework, a disk actuated by said time-recording means, friction means for imparting movement from said disk to said wheel, and sheet-adjusting means controlled in its operation by said wheel.

33. In a time-recorder, the combination with a framework and time-recording mechanism arranged therein, of a rotatably-mounted wheel carried by said framework, a disk spaced from said wheel, means actuated by said time-recording means for rotating said disk, friction means for imparting movement from said disk to said wheel, means for locking said wheel against rotation, means for releasing said lock, and sheet-adjusting means governed in its movement by said wheel.

34. In a time-recorder, the combination with a framework and time-recording mechanism arranged therein, of a shaft fixed in said frame, a sleeve rotatably surrounding said shaft, means actuated by said time-recording mechanism for operating said sleeve, a wheel rotatably mounted upon said shaft, means for locking said wheel against movement, means actuated by said sleeve for releasing said locking means, sheet-adjusting means, and means for actuating the same controlled in its operation by said wheel.

35. In a time-recorder, the combination with a framework and time-recording mechanism arranged therein, of a disk actuated thereby, a second disk spaced from the first disk, pin-and-slot connections between said disks, a wheel rotatably mounted in said framework, frictional means for imparting movement from the second-mentioned disk to said wheel, sheet-adjusting means, and means actuating the same governed in its movement by said wheel.

36. In a time-recorder, the combination with a framework, a time-recording mechanism arranged therein, of a support for a sheet adapted to receive records from said time-recording mechanism, a rock-shaft, means carried by said rock-shaft, and engaging said support, means for moving said rock-shaft for actuating said support, and means for moving the support independently of the movement of the rock-shaft.

37. In a time-recorder, the combination with a framework and time-recording mechanism arranged therein, of a wheel governing the recording of said time-recording mechanism, a rotatably-mounted disk, friction means for imparting movement from said disk to said wheel, means for locking said disk against movement, means for releasing said lock, means for rotating said disk, and means for rotating the wheel independently of the movement imparted thereto from the disk.

38. In a time-recorder, the combination with a framework and time-recording mechanism arranged therein, of a wheel governing the recording of said time-recording mechanism, friction means for imparting movement to said wheel, means for rotating said friction means, means for locking said rotating means against movement, means for releasing said lock, and means for rotating said friction means independently of the first-mentioned rotating means.

39. In a time-recorder, the combination with a framework and time-recording mechanism arranged therein, of a wheel governing the recording of said recording mechanism, friction means for rotating the same, a disk for actuating said rotating means, means for locking said disk against movement, means for releasing said lock, and means independent of said disk for rotating said friction means.

40. In a time-recorder, the combination with a framework and time-recording mechanism arranged therein, of a wheel governing the recording of said time-recording means, a ratchet-wheel frictionally engaging said governing-wheel, a pawl for actuating said ratchet-wheel, and means for actuating the ratchet-wheel independently of the pawl.

41. In a time-recorder, the combination with a framework and time-recording mechanism arranged therein, of a wheel governing the recording of said time-recording mechanism, a ratchet-wheel frictionally engaging the same, a pawl engaging said ratchet-wheel for actuating the same, means for imparting movement to said wheel independently of said pawl, and means for locking said independent means against movement.

42. In a time-recorder, the combination with a framework and time-recording mechanism arranged therein, of a wheel governing the recording of said time-recording mechanism, a ratchet-wheel frictionally engaging said governing-wheel, a pawl for actuating said ratchet-wheel, means for imparting movement to said ratchet-wheel independently of said pawl, means for locking said independent means against movement, and means actuated by said time-recording mechanism for releasing said lock.

43. In a time-recorder, the combination with a framework and time-recording mechanism arranged therein, of a wheel governing the recording of said time-recording mechanism, a friction device for actuating said wheel, means actuated by said time-recording mechanism for rotating said friction device, and means adapted to be actuated independently of said time-recording mechanism for rotating said friction device.

44. In a time-recorder, the combination with a framework and time-recording mechanism arranged therein, of a wheel governing the recording of said time-recording mechanism, a disk spaced from said wheel and fixedly connected thereto, friction means interposed between said disk and wheel for imparting movement to the wheel, a dog engaging said disk for locking the same against movement, a cam-wheel spaced from said disk, connections between said cam-wheel and disk for imparting movement from the cam-wheel to the disk, a finger connected with said dog for engaging said cam-wheel for effecting release of the dog when the cam-wheel is actuated, means operated by said time-recording mechanism for actuating said cam-wheel, and means for actuating said friction means.

45. In a time-recorder, the combination with a framework and time-recording mechanism arranged therein, of a shaft fixed in said framework, a wheel governing the recording of said recording mechanism rotatably mounted on said shaft, a disk spaced from said wheel, friction means interposed between said disk and wheel for imparting movement from the disk to the wheel, a ratchet-wheel engaged by said friction means, means for actuating said disk, a pawl engaging said ratchet-wheel, and means for actuating said pawl for rotating said ratchet-wheel.

46. In a time-recorder, the combination with a framework and time-recording mechanism arranged therein, of a wheel for governing the recording of said time-recording mechanism, a disk spaced therefrom, friction means interposed between said disk for imparting movement from the disk to the wheel, a lever extending between said wheel and disk, and means carried thereby adapted to engage said friction means for actuating the same.

47. In a time-recorder, the combination with a framework and time-recording mechanism arranged therein, of a shaft rotatably mounted in said framework, a spring engaging said shaft for retaining the same in a given position, a hammer pivotally mounted on said shaft, a bracket carried by said shaft and movable therewith, limiting the play of said hammer, a cushion carried by said bracket for taking up the play of said hammer, means for supporting a sheet between said hammer and said time-recording mechanism, and means for moving said bracket for rotating said shaft against the pressure of said spring and for releasing said bracket after such movement thereof.

48. In a time-recorder, the combination with a framework and time-recording mechanism arranged therein, of a shaft journaled in said framework, a spring normally retaining said shaft in a given position, a hammer pivotally carried by said shaft, a bracket carried by the shaft limiting the play of said hammer, a cushion taking up the play of said hammer, means for supporting a sheet between said hammer and time-recording mechanism, a spur projecting from said bracket, a lever, and a trigger carried by said lever adapted to engage said spur for moving the same and for riding over the same after movement thereof.

49. In a time-recorder, the combination with a framework and time-recording mechanism arranged therein, of an operating-shaft mounted in said framework, a cam carried thereby, a lever actuated by said cam, a trigger carried by said lever, a shaft journaled in said framework beneath the said trigger, a spur carried by said shaft in the path of movement of said trigger, a hammer pivotally carried by said shaft, a cushion taking up the play of said hammer, and means for positioning a sheet between said hammer and time-recording mechanism.

50. In a time-recorder, the combination with a framework and time-recording mechanism arranged therein, of a chute designed to contain a sheet adapted to receive indications from said time-recording mechanism, arms inclosing said chute, means carried by said arms adapted to engage said sheet, means for moving said arms longitudinally of the chute, and means for moving said arms laterally with respect to the chute.

51. In a time-recorder, the combination with a framework, a time-recording mechanism arranged therein, of a support for the sheet adapted to receive records from the time-recording mechanism, a rock-shaft, connections between said rock-shaft and support, a crank-arm carried by said rock-shaft, a link engaging said arm, means for actuating said link, and means for adjusting the length of the stroke of the link.

In testimony whereof I affix my signature in presence of two witnesses.

ERIC E. PETERSON.

Witnesses:
JOHN B. CUMMINGS,
EDWARD S. WALL.